United States Patent
Ishida et al.

(10) Patent No.: US 8,335,622 B2
(45) Date of Patent: Dec. 18, 2012

(54) VEHICLE DRIVE CONTROL DEVICE

(75) Inventors: Yasuhito Ishida, Toyokawa (JP); Gen Inoue, Susono (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1065 days.

(21) Appl. No.: 12/204,402

(22) Filed: Sep. 4, 2008

(65) Prior Publication Data

US 2009/0069991 A1 Mar. 12, 2009

(30) Foreign Application Priority Data

Sep. 6, 2007 (JP) ................................. 2007-232076

(51) Int. Cl.
*G05D 1/00* (2006.01)

(52) U.S. Cl. ................. 701/60; 701/36; 701/55; 701/56; 701/64; 701/66; 701/69; 701/99

(58) Field of Classification Search ................ 700/1, 29, 700/36, 48, 51–70, 82–107; 477/7, 30, 31, 477/34–40, 42–49, 70–75, 77–800; 123/319, 123/334, 335, 339.1, 349, 350, 395; 701/1, 701/29, 36, 48, 51–70, 82–107
See application file for complete search history.

(56) References Cited

U.S. PATENT DOCUMENTS

| | | | | |
|---|---|---|---|---|
| 5,023,792 A | * | 6/1991 | Shioyama | 701/97 |
| 5,046,178 A | * | 9/1991 | Hibner et al. | 701/60 |
| 5,211,082 A | * | 5/1993 | Sasaki et al. | 475/119 |
| 5,759,131 A | * | 6/1998 | Kosik et al. | 477/84 |
| 5,795,262 A | * | 8/1998 | Robinson | 477/92 |
| 5,833,572 A | * | 11/1998 | Leising et al. | 477/113 |
| 5,855,533 A | * | 1/1999 | Tolkacz et al. | 477/110 |
| 5,887,670 A | * | 3/1999 | Tabata et al. | 180/65.25 |
| 5,991,678 A | * | 11/1999 | Gil | 701/51 |
| 6,030,316 A | * | 2/2000 | Kadota | 477/121 |
| 6,558,293 B2 | * | 5/2003 | Skupinski et al. | 477/97 |

(Continued)

FOREIGN PATENT DOCUMENTS

JP 60-94827 A 5/1985

(Continued)

OTHER PUBLICATIONS

Japanese Office Action issued May 10, 2011 by the Japanese Patent Office in Japanese Application No. 2007-232076 and English language translation.

*Primary Examiner* — Jonathan M Dager
(74) *Attorney, Agent, or Firm* — Buchanan Ingersoll & Rooney PC

(57) ABSTRACT

A vehicle device control device includes an automatic drive control device for executing an automatic drive control by controlling at least a driving torque generating device, which applies a driving torque on a vehicle, so that a vehicle speed reaches a preset target vehicle speed, and a shift position determination portion for determining a shift position of a gear lever of the vehicle, wherein in a case where the shift position determination portion determines that the gear lever is set at a neutral position on the basis of a determination result of the shift position determination portion while the automatic drive control is executed, the automatic drive control device controls the driving torque generating device so that the driving torque applied to the vehicle becomes zero while continuously executing the automatic drive control.

8 Claims, 4 Drawing Sheets

U.S. PATENT DOCUMENTS

| | | | |
|---|---|---|---|
| 6,626,796 B2 * | 9/2003 | Schwab et al. | 477/74 |
| 6,846,269 B2 * | 1/2005 | Reuschel et al. | 477/110 |
| 6,863,639 B1 * | 3/2005 | Inoue et al. | 477/116 |
| 7,789,797 B2 * | 9/2010 | Chen et al. | 477/116 |
| 2002/0116113 A1 * | 8/2002 | Kaneko | 701/112 |
| 2003/0092530 A1 * | 5/2003 | Schwab et al. | 477/171 |
| 2003/0114271 A1 * | 6/2003 | Inoue et al. | 477/117 |
| 2003/0131820 A1 * | 7/2003 | Mckay et al. | 123/198 F |
| 2004/0014562 A1 * | 1/2004 | Kresse et al. | 477/107 |
| 2004/0044448 A1 * | 3/2004 | Ramaswamy et al. | 701/22 |
| 2004/0116247 A1 * | 6/2004 | Wakamatsu | 477/86 |
| 2004/0127320 A1 * | 7/2004 | Inoue et al. | 475/210 |
| 2004/0215385 A1 | 10/2004 | Aizawa et al. | |
| 2004/0254048 A1 * | 12/2004 | Yone | 477/108 |
| 2005/0027423 A1 * | 2/2005 | Minami et al. | 701/51 |
| 2006/0293149 A1 * | 12/2006 | Landes | 477/181 |
| 2008/0090696 A1 * | 4/2008 | Okubo et al. | 477/5 |
| 2009/0120710 A1 * | 5/2009 | Hasegawa et al. | 180/365 |

FOREIGN PATENT DOCUMENTS

| | | |
|---|---|---|
| JP | 2-227533 A | 9/1990 |
| JP | 9-290665 A | 11/1997 |
| JP | 2003-72417 A | 3/2003 |
| JP | 2004-090679 A | 3/2004 |

* cited by examiner

VEHICLE DRIVE CONTROL DEVICE

This application is based on and claims priority under 35 U.S.C. §119 to Japanese Patent Application 2007-232076, filed on Sep. 6, 2007, the entire contents of which is incorporated herein by reference.

FIELD OF THE INVENTION

The present invention relates to a vehicle drive control device.

BACKGROUND

In order to reduce a driving operation of a vehicle by a driver, a vehicle drive control device for executing an automatic drive control such as a cruise control for controlling a vehicle speed to be at a constant target vehicle speed, an adaptive cruise control (ACC) for controlling the vehicle to follow a vehicle traveling in front of the subject vehicle (hereinafter referred to as a leading vehicle) and the like, is adapted to the vehicle. In the vehicle drive control device, an engine for applying a drive torque to the vehicle and a braking device for applying a braking torque to the vehicle are cooperatively controlled so that the vehicle speed reaches a target vehicle speed. More specifically, an automatic drive control electronic control unit (hereinafter referred to as an automatic drive control ECU) calculates a target driving torque so that the vehicle speed reaches the target vehicle speed. The calculated target driving torque is outputted to an engine ECU, then the engine ECU controls the engine, which serves as a driving torque generating device, on the basis of the target driving torque. Further, in the vehicle drive control device, the automatic drive control ECU calculates a target braking torque so that the vehicle speed reaches the target vehicle speed. The calculated braking torque is outputted to a brake ECU, then the brake ECU controls the braking device, which serves as a braking torque generating device, on the basis of the target braking torque.

There is a conventional automatic drive control for controlling the vehicle to be driven at a low target speed, for example, at approximately 10 km/h. For example, a vehicle drive control device disclosed in JP2004-90679A executes an automatic drive control so that the vehicle is driven at a target speed as low as about a creep speed.

Road surfaces on which the vehicle travels are divided into on-road and off-road. In a case where the vehicle travels off-road, the vehicle may become stuck depending on a condition of the road surface. In a case where the vehicle becomes stuck, if the vehicle is somewhat able to move forward or backward, the vehicle may be able to free itself from the stuck situation by performing a forward-rearward maneuver. The forward-rearward maneuver is an operation of repeatedly moving the vehicle forward and rearward at a position where the vehicle is stuck in order to increase a force acting on the vehicle. More specifically, in the forward-rearward maneuver, the force acting on the vehicle is increased by utilizing a reaction generated when the vehicle moves rearward to when the vehicle moves forward and by utilizing the reaction generated when the vehicle moves forward to when the vehicle moves rearward. In order to increase the force acting on the vehicle when the vehicle moves forward and rearward, a driver needs to perform an acceleration operation at a right timing when the reaction is generated, in addition to a shift operation towards a direction where the vehicle moves. In other words, in order to perform the forward-rearward maneuver, the driver needs to repeatedly shift a gear lever between a forward movement position and a neutral position, between the neutral position and a rearward movement position, and between the forward movement position and the rearward movement position via the neutral position.

In the conventional vehicle drive control device, when the gear lever is shifted at the neutral position, the automatic drive control is cancelled. Therefore, in the case where the vehicle having the conventional vehicle drive control device becomes stuck, the driver needs to perform the forward-rearward maneuver by manually operating the gear lever (not shown) and an acceleration pedal (not shown). In other words, in the conventional drive control device, the automatic drive control is not useful for freeing the vehicle from the stuck situation. Further, in the vehicle drive control device disclosed in JP2004-90679A, a driving torque is gradually reduced while the gear lever is set at the neutral position. Therefore, in a case where the gear lever is shifted from the neutral position to the forward movement position or from the neutral position to the rearward movement position while the driving torque by the engine still remains in a state where the gear lever is set at the neutral position, the remaining driving torque is applied to a transmission apparatus. As a result, disadvantages such that the vehicle is suddenly accelerated, a load is applied to the transmission apparatus and the like may occur.

A need thus exists for a vehicle drive control device which is not susceptible to the drawback mentioned above.

SUMMARY OF THE INVENTION

According to an aspect of the present invention, a vehicle device control device includes an automatic drive control device for executing an automatic drive control by controlling at least a driving torque generating device, which applies a driving torque on a vehicle, so that a vehicle speed reaches a preset target vehicle speed, and a shift position determination portion for determining a shift position of a gear lever of the vehicle, wherein in a case where the shift position determination portion determines that the gear lever is set at a neutral position on the basis of a determination result of the shift position determination portion while tire automatic drive control is executed, the automatic drive control device controls the driving torque generating device so that the driving torque applied to the vehicle becomes zero while continuously executing the automatic drive control.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
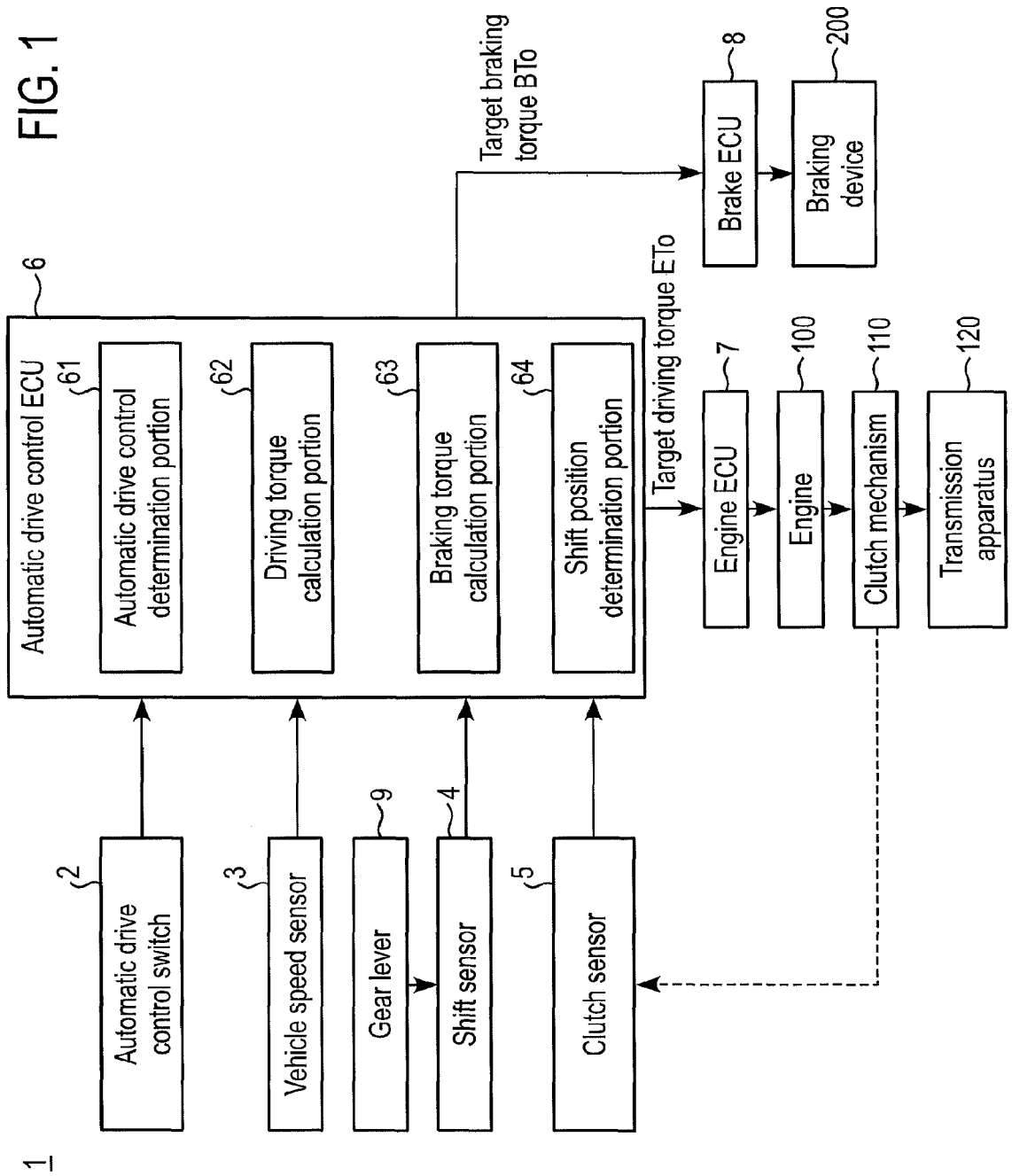
FIG. 1 is a diagram illustrating a structure of a vehicle drive control device according to an embodiment as an example.

FIG. 1 illustrates a structure of a vehicle drive control device 1 according to the embodiment as an example. As illustrated in FIG. 1, the vehicle drive control device 1 according to the embodiment is adapted to a vehicle (which is not illustrated and is referred to as a vehicle C hereinafter) and executes an automatic drive control so that a vehicle speed of the vehicle C reaches a target vehicle speed. Further, the vehicle drive control device 1 is configured by an automatic drive control switch 2, a vehicle speed sensor 3, a shift sensor 4, a clutch sensor 5, an automatic drive control electronic control unit 6 (hereinafter referred to as an automatic drive control ECU 6), an engine electronic control unit 7 (hereinafter referred to as an engine ECU 7), a brake electronic control unit 8 (a brake ECU 8) and the like. The automatic drive control ECU 6 serves as an automatic drive control means.

A reference numeral 100 indicates an engine that serves as a driving torque generating device for generating a driving torque and for applying the generated driving torque on the vehicle C. The engine 100 is controlled by the engine ECU 7 on the basis of a target driving torque ETo calculated by the automatic drive control ECU 6 and applies the target driving torque ETo on the vehicle C. A reference numeral 110 indicates a clutch mechanism, which is provided between the engine 100 and wheels (not shown) and controls a connecting state between the engine 100 and the wheels. More specifically, in this embodiment, the clutch mechanism 110 controls the connecting state between the engine 100 and a transmission apparatus 120, which is connected to each wheel and is described below. In a case where the clutch mechanism 110 is in an ON state, the clutch mechanism 110 connects the engine 100 and the transmission apparatus 120 so that the driving torque generated by the engine 100 is transmittable to the transmission apparatus 120. On the other hand, in a case where the clutch mechanism 110 is in an OFF state, the clutch mechanism 110 cancels the connection between the engine 100 and the transmission apparatus 120, so that the driving torque generated by the engine 100 is not transmittable to the transmission apparatus 120. The reference numeral 120 indicates the transmission apparatus that is an apparatus for transmitting the driving torque generated by the engine 100 to each wheel. The transmission apparatus 120 changes a transmission state of the driving torque (i.e. speed-increasing transmission, speed-reducing transmission) by changing gear ratios. Further, a reference numeral 200 indicates a braking device 200 that generates a braking torque and applies the generated brake torque on the vehicle C. The braking device 200 is controlled by the brake ECU 8 on the basis of a target braking torque BTo calculated by the automatic drive control ECU 6 and applies the braking torque BTo on the vehicle C. More specifically, the braking device 200 generates the braking torque on the basis of a braking operation preformed by a driver, i.e. on the basis of a depression of a brake pedal (not shown) by the driver.

The automatic drive control switch 2 functions as a control starting trigger. The automatic drive control switch 2 is provided at an interior of the vehicle C (not shown) and is turned on when the driver operates the same. The automatic drive control switch 2 is connected to the automatic drive control ECU 6. In a case where the automatic drive control switch 2 is turned on by the driver, the automatic drive control switch 2 outputs an ON signal to the automatic drive control ECU 6. Thus, the automatic drive control switch 2 functions as the control starting trigger for actuating the automatic drive control.

The vehicle speed sensor 3 detects a vehicle speed V of the vehicle C. The vehicle speed sensor 3 is connected to the automatic drive control ECU 6 and the detected vehicle speed V of the vehicle C is outputted to the automatic drive control ECU 6. The vehicle speed sensor 3 is configured from, for example, a vehicle wheel speed sensor provided at each wheel of the vehicle C. In this case, each wheel speed v1, v2, v3 and v4 detected by the respective vehicle wheel sensors, which serve as the vehicle speed sensor 3, is outputted to the automatic drive control ECU 6, and the automatic drive control ECU 6 calculates the vehicle speed V of the vehicle C on the basis of each outputted wheel speed v1, v2, v3 and v4.

The shift sensor 4 serves as a shift position detection means. The shift sensor 4 detects shift positions of a gear lever 9 operated by the driver. The shift sensor 4 is connected to the automatic drive control ECU 6, and the detected shift position of the gear lever is outputted to the automatic control ECU 6. The shift positions of the gear lever include, for example, a neutral position (which referred to simply as a N position), a forward movement position, a rearward movement position and the like. In a case where the gear lever is set at the N position, the clutch mechanism 110 is turned to be in the OFF state, so that the driving torque generated by the engine 100 is not transmitted to each wheel via the transmission apparatus 120. In a case where the gear lever 9 is set at the forward movement position, the clutch mechanism 110 is turned to be in the ON state, so that the driving torque generated by the engine 100 is transmitted to each wheel via the transmission apparatus 120. As a result, the driving torque generated by the engine 100 acts on the vehicle C in a direction of forwardly moving the vehicle C. In a case where the gear lever 9 is set at the rearward movement position, the clutch mechanism 110 is turned to be in the ON state, so that the driving torque generated by the engine 100 is transmitted to each wheel via the transmission apparatus 120. As a result, the driving torque generated by the engine 100 acts on the vehicle in a direction of rearwardly moving the vehicle C.

The clutch sensor 5 serves as a clutch state detection means. The clutch sensor 5 detects ON/OFF states of the clutch mechanism 110. The clutch sensor 5 is connected to the automatic drive control ECU 6, and the detected ON/OFF state of the clutch mechanism 110 is outputted to the automatic drive control ECU 6.

The automatic drive control ECU 6 calculates the target driving torque ETo and the target braking torque BTo so that the vehicle speed V reaches a target vehicle speed Vo and outputs the calculated target driving torque ETo and target braking torque BTo to the engine ECU 7 and the brake ECU 8, respectively. The automatic drive control ECU 6 controls the engine 100 on the basis of the target driving torque ETo via the engine ECU 7 and also controls the braking device 200 on the basis of the target braking torque BTo via the brake ECU 8. In other words, the automatic drive control ECU 6 coordinately controls the engine 100 and the brake 200 so that the vehicle speed V reaches the preset target vehicle speed Vo. The automatic drive control ECU 6 includes an automatic drive control determination portion 61, a driving torque calculation portion 62 (a clutch state determination means), a braking torque calculation portion 63 and a shift position determination portion 64 (a shift position determination means). A known configuration is adapted to a hardware configuration of the automatic drive control ECU 6, therefore, a description thereof is not provided. Further, the target vehicle speed Vo is a value by which the vehicle may be driven off road at a low speed, for example, the target vehicle speed Vo is approximately 10 km/h.

The automatic drive control determination portion 61 determines an intention of starting the automatic drive control by the driver. The automatic drive control determination portion 61 determines whether or not to start the automatic drive control on the basis of whether or not the ON signal is outputted by the automatic drive control switch 2 being operated by the driver, i.e. on the basis of the ON/OFF state of the automatic drive control switch 2.

The driving torque calculation portion 62 calculates the target driving torque ETo, which is generated by the engine 100. More specifically, the driving torque calculation portion 62 calculates the target driving torque ETo so that the vehicle speed V of the vehicle C reaches the preset target vehicle speed Vo. Further more specifically, in the case where the gear lever is set at the N position, the driving torque calculation portion 62 calculates the target driving torque ETo as zero so that the driving torque acting on the vehicle C becomes zero. In other words, in the case where the gear lever is set at the N position, the automatic drive control ECU 6 controls the vehicle (i.e. the state of the torque) to be in the same state as in a state where the automatic drive control is not executed while the automatic control is being executed. Further, in a case where the gear lever is shifted from the N position to the forward movement position or to the rearward movement position, the driving torque calculation portion 62 is shifted to a state for calculating the target driving torque ETo so that the vehicle speed V of the vehicle C reaches the preset target vehicle speed Vo from the state for calculating the driving torque as zero, when automatic drive control starting conditions are satisfied. The automatic drive control starting conditions (a predetermined condition) are: 1) the clutch sensor 5 detects that the clutch mechanism 110 is in the ON state, and 2) a predetermined time has passed since the gear lever is shifted to the forward movement position nor the rearward movement position from the N position. The predetermined time refers to a time within which the normal clutch mechanism 110 is switchable from the OFF state to the ON state in the case where the gear lever is shifted from the N position to the forward movement position or to the rearward movement position. As a result, even if a malfunction occurs at the shift sensor 4, the target driving torque ETo is calculated by the driving torque calculation portion 62 so that the vehicle speed V of the vehicle C reaches the target vehicle speed Vo before the clutch mechanism 110 is turned to be in the ON state, therefore, the engine 100 is prevented from being controlled on the basis of the target driving torque ETo calculated by the engine ECU 7.

The braking torque calculation portion 63 calculates the target braking torque BTo, which is generated by the braking device 200. More specifically, the braking torque calculation portion 63 calculates the target braking torque BTo so that the vehicle speed V of the vehicle C reaches the preset target vehicle speed Vo.

The shift position determination portion 64 determines shift positions of the gear lever. The shift position determination portion 64 determines whether the gear lever is set at the N position, the forward movement position, the rearward movement position or at another position on the basis of the shift position of the gear lever detected by the shift sensor 4.

The engine ECU 7 controls the engine 100 on the basis of the target driving torque ETo. The engine ECU 7 is connected to the automatic drive control ECU 6 and controls the engine 100 on the basis of the target driving torque ETo calculated by and outputted from the automatic drive control ECU 6. Further, the engine ECU 7 is connected to an acceleration sensor (not shown) that detects an amount of acceleration operation performed by the driver. The engine ECU 7 controls the engine 100 on the basis of the detected amount of the acceleration operation so that the engine 100 generates the driving torque based on the amount of the acceleration operation by the driver.

The brake ECU 8 controls the braking device 200 on the basis of the target braking torque BTo. The brake ECU 8 is connected to the automatic drive control ECU 6 and controls the braking device 200 on the basis of the target braking torque BTo calculated by and outputted from the automatic drive control ECU 6. Additionally, the braking device 200 is configured to apply the braking torque to each wheel. More specifically, the brake ECU 8 controls the braking device 200 on the basis of the target braking torques BToW1, BToW2, BToW3 and BToW4 calculated by and outputted from the automatic drive control ECU 6 relative to the respective wheels in order to apply the braking torque to each wheel. As a result the braking torque acts on the vehicle C.

Figure 2:
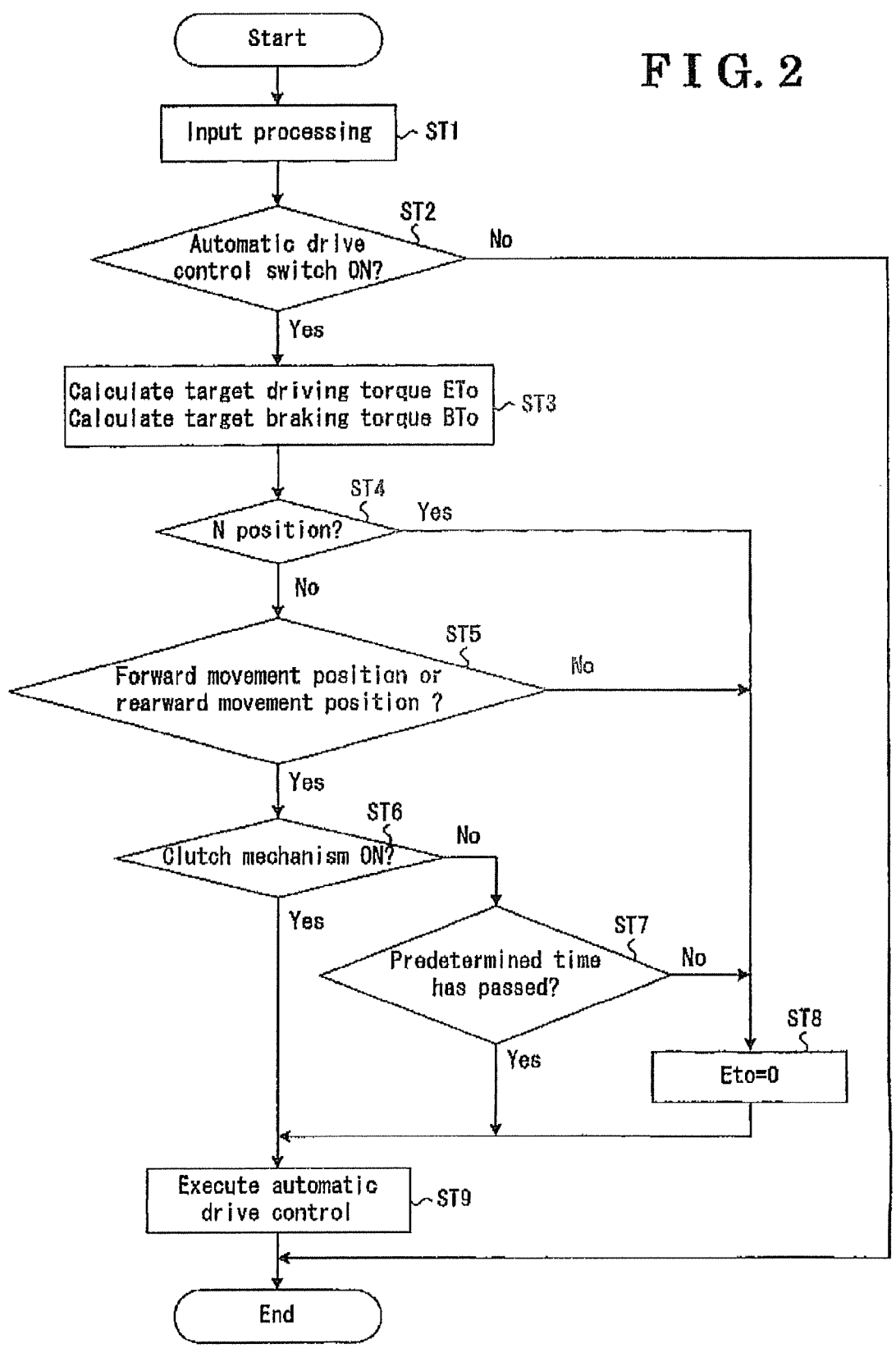
FIG. 2 is a diagram illustrating a flow of an automatic drive control of the vehicle drive control device according to the embodiment.
Figure 3:
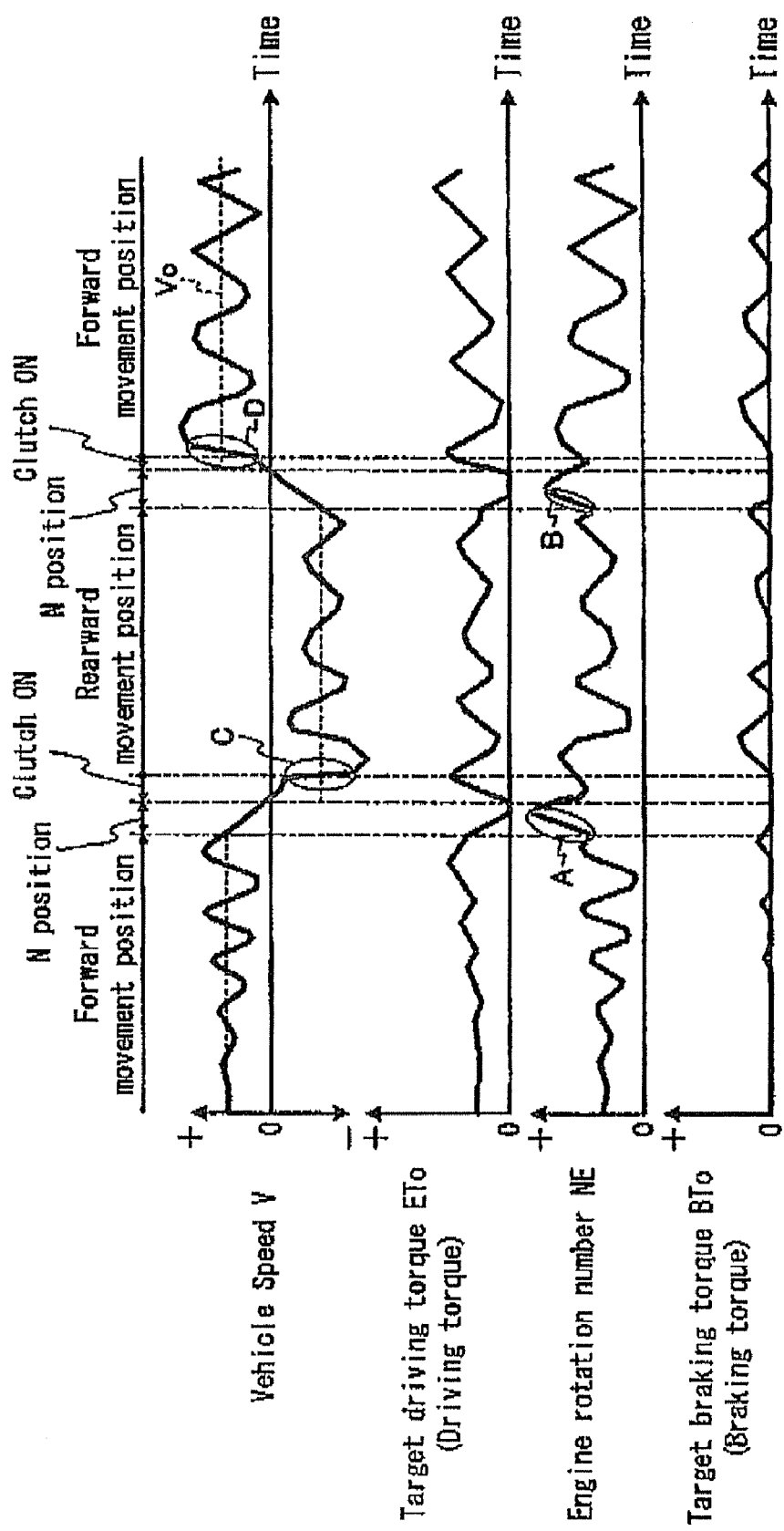
FIG. 3 is a diagram for explaining an operation of a conventional vehicle drive control device.
Figure 4:
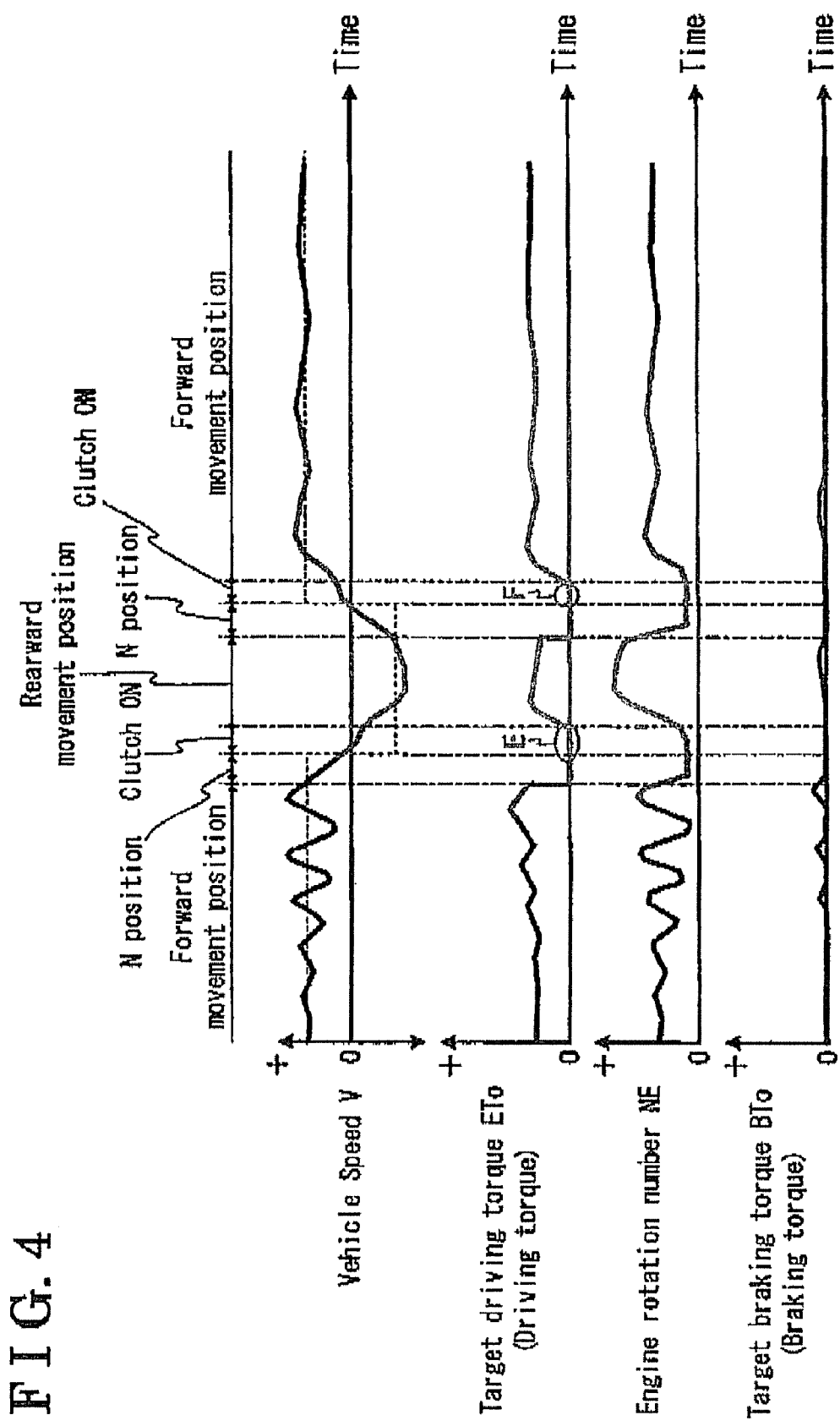
FIG. 4 is a diagram for explaining an operation of the vehicle drive control device according to the embodiment.

The automatic drive control executed by the vehicle drive control device 1 according to the embodiment is described hereinbelow. FIG. 2 is a flow chart illustrating a flow of the automatic drive control executed by the vehicle drive control device 1 according to the embodiment. FIG. 3 is a diagram for explaining an operation of the conventional vehicle drive control device. FIG. 4 is a diagram for explaining an operation of the vehicle drive control device 1 of the embodiment. An automatic drive control method when the gear lever is set at the N position in the automatic drive control executed by the vehicle drive control device 1 is described below. The automatic drive control by the vehicle drive control device 1 is executed in each control cycle.

As illustrated in FIG. 2, the automatic drive control ECU 6 executes an input processing (ST1). In ST1, the automatic drive control ECU 6 obtains the ON/OFF state of the automatic drive control switch 2, the vehicle speed V detected by and outputted from the vehicle speed sensor 3, the shift position of the gear lever detected by the shift sensor 4, the ON/OFF state of the clutch mechanism 110 detected by the clutch sensor 5, and the like.

Then, the automatic drive control determination portion 61 of the automatic drive control ECU 6 determines whether or not the automatic drive control switch 2 is in the ON state (ST2). More specifically, the automatic drive control determination portion 61 determines the intention of starting the automatic drive control by the driver on the basis of the obtained ON/OFF state of the automatic drive control switch 2. Further, the automatic drive control determination portion 61 determines whether or not the automatic drive control starting conditions are satisfied on the basis of the ON/OFF state of the automatic drive control switch 2.

In the case where the automatic drive control switch 2 is determined to be in the ON state (Yes in ST2), the automatic drive control ECU 6 proceeds to ST3 where the automatic drive control ECU 6 calculates the target driving torque ETo and the target braking torque BTo. More specifically, in ST3, the driving torque calculation portion 62 of the automatic drive control ECU 6 calculates the target driving torque ETo so that the obtained vehicle speed V reaches the target vehicle speed Vo, and then the calculated target driving torque ETo is outputted to the engine ECU 7. Further, in ST3, the braking torque calculation portion 63 of the automatic drive control ECU 6 calculates the target braking torque BTo so that the obtained vehicle speed V reaches the target vehicle speed Vo, and then the calculated target braking torque BTo is outputted to the brake ECU 8, Then, the shift position determination portion 64 of the automatic drive control ECU 6 determines whether or not the obtained shift position of the gear lever indicates the N position (ST4). In other words, the automatic drive control ECU 6 determines whether or not the N position is detected by the shift sensor 4.

In a case where the shift position determination portion 64 determines that the gear lever is set at the N position (Yes in ST4), the driving torque calculation portion 62 calculates the target driving torque ETo as zero (ST8).

Then, the automatic drive control ECU 6 executes the automatic drive control in ST9. In ST9, the automatic drive control ECU 6 outputs the target driving torque ETo, which is calculated as zero by the driving torque calculation portion 62, and the target braking torque calculated by the braking torque calculation portion 63 to the engine ECU7 and the brake ECU8, respectively. The automatic drive control is executed in a manner where the engine ECU 7 controls the engine 100 on the basis of the target driving torque ETo, which is calculated as zero, and the brake ECU 8 controls the braking device 200 on the basis of the target braking torque BTo. As the target driving torque ETo is calculated as zero, the driving torque generated by the engine 100 becomes zero by the engine ECU 7 controlling the engine 100 on the basis of the target driving torque ETo, therefore, the driving torque acting on the vehicle C immediately drops to zero. In other words, in the case where the gear lever is set at the N position, the automatic drive control ECU 6 controls the engine 100 so as not to generate the driving torque.

On the other hand, in a case where the shift position determination portion 64 determines that the gear lever is not set at the N position (No in ST4), the shift position determination portion 64 determines whether the gear lever is set either at the forward movement position or the rearward movement position (ST5). More specifically, the shift position determination portion 64 determines whether or not either the forward movement position or the rearward movement position is detected by the shift sensor 4.

In a case where the shift position determination portion 64 determines that the gear lever is set either at the forward movement position or the rearward movement position (Yes in ST5), the driving torque calculation portion 62 determines whether the obtained ON/OFF state of the clutch mechanism 110 indicates the ON state (ST6). More specifically, in ST6, the driving torque calculation portion 62 determines whether or not the clutch mechanism 110 is in the state of actually transmitting the driving torque generated by the engine 100 to each wheel, in the case where the clutch mechanism 110 is determined to be in the state where the driving torque generated by the engine 100 is ready to be transmitted to each wheel.

In a case where the driving torque calculation portion 62 determines that the obtained ON/OFF state of the clutch mechanism 110 indicates that the clutch mechanism 110 is in the OFF state (No in ST6), the driving torque calculation portion 62 determines whether or not the predetermined time has passed (ST7). More specifically, in ST7, the driving torque calculation portion 62 determines whether or not the predetermined time has passed since the gear lever is shifted to the forward movement position or the rearward movement position from the N position.

On the other hand, in a case where the driving torque calculation portion 62 determines that the obtained ON/OFF state of the clutch mechanism 110 indicates that the clutch mechanism 110 is in tire ON state (Yes in ST6), or in a case where the driving torque calculation portion 62 determines that the predetermined time has passed (Yes in ST7), the automatic drive control ECU 6 executes the automatic drive control (ST9). In other words, the automatic drive control ECU 6 executes the automatic drive control in the case where the vehicle is in the state where the driving torque generated by the engine 100 is ready to be transmitted to each wheel and in the case where the driving torque is actually transmittable to each wheel. In ST9, the automatic drive control ECU 6 outputs the target driving torque ETo calculated by the driving torque calculation portion 62 and the target braking torque BTo calculated by the braking torque calculation portion 63 to the engine ECU 7 and the brake ECU 8, respectively. The automatic drive control is executed in the manner where the engine ECU 7 controls the engine 100 on the basis of the target driving torque ETo, and the brake ECU 8 controls the braking device 200 on the basis of the target braking torque BTo so that the vehicle speed V reaches the target vehicle speed Vo. Hence, the driving torque generated by the engine 100 on the basis of the target driving torque ETo and the braking torque generated by the braking device 200 on the basis of the target braking torque BTo act on the vehicle C.

Further, in a case where the shift position determination portion 64 determines that the gear lever is set at neither the forward movement position nor the reverse movement position (No in ST5), or in a case where the driving torque calculation portion 62 determines that the predetermined time has not passed (No in ST7), as mentioned above, the driving torque calculation portion 62 calculates the driving torque ETo as zero (ST8). Then, the automatic drive control ECU 6 executes the automatic drive control (ST9). Therefore, in the case where the gear lever is set at other positions, such as a parking position or at the neutral position, the driving torque acting on the vehicle C becomes zero, because the driving torque generated by the engine 100 is controlled to be zero by the engine ECU 7 controlling the engine 100 on the basis of the target driving torque ETo, which is calculated as zero. In other words, the automatic drive control ECU 6 controls the engine 100 so as not to generate the driving torque in the case where the vehicle is in the state where the driving torque generated by the engine 100 is ready to be transmitted to each wheel but the driving torque is actually not transmittable to each wheel.

In the conventional drive control device that gradually reduces the driving torque when the gear lever is set at the N position, as illustrated in FIG. 3, the target driving torque ETo is calculated to be gradually and continuously decreased by shifting the gear lever to the N position from the forward movement position and to the N position from the rearward position in order to gradually reduce the driving torque. When the gear lever is set at the N position, an engine rotation number NE (an engine rotational speed) is increased because of the driving torque generated by the engine 100 (see circles indicated by letters A and B in FIG. 3). Then, the target driving torque ETo is calculated so that the vehicle speed V reaches the target vehicle speed Vo by shirring the gear lever from the N position to the forward movement position or from the N position to the rearward movement position. Then, the engine 100 is controlled on the basis of the target driving torque ETo by the engine ECU 7, therefore the engine 100 generates the driving torque. Immediately after the gear lever is shifted to the forward movement position or to the rearward movement position, because the clutch mechanism 110 remains in the OFF state, the vehicle speed V does not reach the target vehicle speed Vo, therefore, the automatic drive control ECU 6 outputs the target driving torque ETo to the engine ECU 7 in order to reach the vehicle speed V to the target vehicle speed Vo. The automatic drive control is executed in a manner where the engine ECU 7 controls the engine 100 on the basis of the target driving torque so that the vehicle speed V reaches the target vehicle speed Vo. In the conventional vehicle drive control device, although the automatic drive control is executed, the vehicle speed V still does not reach the target vehicle speed Vo because the clutch mechanism is in the OFF state, therefore, the target torque ETo is calculated to be further greater value. As a result, the target driving torque ETo is calculated so as to continuously increase, thereby increasing the driving torque generated by the engine 100. In other words, the driving torque is generated and increased before the vehicle is in the state where the driving torque is ready to be transmitted to the wheels and the state where the driving torque is transmittable to the wheels. If the clutch mechanism 110 is turned to be in the ON state while the target driving torque ETo is increasingly calculated, the increasing driving torque generated by the engine 100 is transmitted to each wheel via the transmission apparatus 120, therefore, the vehicle speed V of the vehicle C is suddenly increased (see circles indicated by letters C and D in FIG. 3), which may result in a sudden acceleration of the vehicle C. Further, the driving torque is already generated by the engine 100 while the clutch mechanism 110 is in the OFF state, therefore, when the clutch mechanism 100 is turned to be in the ON state, the driving torque generated by the engine 100 is instantly transmitted to the transmission apparatus 120, therefore a load may be applied to the transmission apparatus 120.

On the other hand, in the vehicle drive control device 1 according to the embodiment, the target driving torque ETo is calculated as zero in the case where the gear lever is set at the N position. Therefore, even if the engine 100 is controlled on the basis of the target driving torque ETo by the engine ECU 7, the engine 100 does not generate the driving torque while the gear lever is set at the N position. Moreover, unless the clutch mechanism 110 is turned to be in the ON state or the predetermined time has passed (No in ST6 or No in ST7), the target driving torque ETo is calculated as zero in ST8, and then in ST9, the automatic drive control is executed so that the driving torque is controlled to be zero no matter whether the vehicle speed V reaches the target vehicle speed Vo or not. On the other hand, in the case where the clutch mechanism 110 is turned to be in the ON or in the case where the predetermined time has passed (Yes in ST6 or Yes in ST7), the engine 110 is controlled in ST9 on the basis of the target driving torque ETo, that is calculated by the engine ECU 7 in ST3 so that the vehicle speed V reaches the target vehicle speed Vo, and the engine 100 generates the driving torque. In the case of the vehicle drive control device 1 that controls the engine 100 not to generate the driving torque while the gear lever is set at the N position, as illustrated in FIG. 4, the target driving torque ETo is calculated as zero by the gear lever shifted to the N position from the forward movement position or to the N position from the rearward movement position, therefore, the driving torque generated by the engine 100 becomes zero. According to the vehicle drive control device 1 of the embodiment, even if the gear lever is set at the N position, the engine 100 does not generate the driving torque, thereby preventing the engine rotation number NE (the engine rotational speed) from increasing. Then, when the gear lever is shifted to the forward movement position from the N position or to the rearward movement position from the N position, the clutch mechanism 110 remains in the OFF state immediately after the gear lever is shifted from the N position to forward movement position or to the rearward movement position. The target driving torque ETo is calculated as zero immediately after the gear lever is shifted from the N position to the forward movement position or to the rearward movement position, as a result, the driving torque generated by the engine 100 becomes zero (see circles indicated by letters E and F in FIG. 4). Then, when the clutch mechanism 110 is turned to be in the ON state, the target driving torque ETo is calculated and the engine 100 generates the driving torque by the engine ECU 7 controlling the engine 100 on the basis of the target driving torque ETo so that the vehicle speed V reaches the target vehicle speed Vo. Therefore, even if the driving torque generated by the engine 100 is transmitted to each wheel via the transmission apparatus 120 when the clutch mechanism 110 is turned to be in the ON state, the driving torque is gradually increased so that the vehicle speed V reaches the target vehicle speed Vo, thereby gradually increasing the vehicle speed V of the vehicle C. As a result, the vehicle C is prevented from being suddenly accelerated. Further, the engine 100 does not generate the driving torque while the clutch mechanism 110 is in the OFF state. Therefore, even when the clutch mechanism 110 is turned to be in the ON state, the driving torque is not instantly transmitted to the transmission apparatus 120. As a result, the load applied to the transmission apparatus may be reduced/prevented. Accordingly, the vehicle drive control device 1 prevents the vehicle C from suddenly accelerating and the transmission apparatus 120 from receiving the load, even when the gear lever is shifted to the forward movement position or to the rearward movement position via the N position.

Accordingly, in the case where the gear lever is set at the N position while the automatic drive control is executed, the engine 100 does not generate the driving torque. Hence, even if the vehicle C becomes stuck, an operation of freeing the vehicle C from the stuck situation is performed while the automatic drive control is executed.

Further, according to the vehicle drive control device 1 of the embodiment, even while the gear lever is set at the N position, the automatic drive control is not cancelled. Hence, for example, even in a case where the gear lever is set at the N position while the vehicle C travels on a road having a declining surface, the vehicle drive control device 1 calculates the target braking torque BTo so that the vehicle speed V reaches the target vehicle speed Vo and the brake ECU 8 controls the braking device 200 on the basis of the target braking torque BTo, and the braking device 200 generates the braking torque. Hence, even if the gear lever is set at the N position, the automatic drive control is executed so that the vehicle speed V reaches the target vehicle speed Vo.

Accordingly, the vehicle drive control device 1 of the embodiment does not stop/cancel the automatic drive control even if the gear lever is set at the neutral position. Further, the vehicle drive control device 1 of the embodiment is adaptive to perform the operation of freeing the vehicle from the stuck situation only by the shift operation while the automatic drive control is executed.

The vehicle drive control device according to the embodiment includes the driving torque calculation portion 62 for determining the ON/OFF state of the clutch mechanism 110 provided between the engine 100 and wheels, wherein in the case where the automatic drive control ECU 6 detects that the gear lever is shifted from the neutral position to a forward movement position or to a rearward movement position based on an output of the shift position determination portion 64 and where the driving torque calculation portion 62 determines that the clutch mechanism 110 is in a ON state on the basis of an output of the driving torque calculation portion 62, the automatic drive control ECU 6 controls the engine 100 so that the vehicle speed V reaches the preset target vehicle speed Vo.

The vehicle drive control device according to Claim 1, wherein in a case where the shift position determination portion 64 determines that the gear lever is shifted from the neutral position to a forward movement position or to a rearward movement position and where a predetermined time has passed, the automatic drive control ECU 6 controls the engine 100 so that the vehicle speed V reaches the preset target vehicle speed Vo.

According to the vehicle drive control device of the embodiment, when the gear lever is set at the neutral position, the driving torque is controlled to be zero. Therefore, even if the vehicle becomes stuck, the operation for freeing the vehicle is performed while the automatic drive control is executed. In other words, the driver only needs to operate the gear lever to shift its shift positions at a right timing of when the reaction is generated in the case where the vehicle becomes stuck while the automatic drive control is executed. As the vehicle drive control of the embodiment does not require the driver to perform a complicated operation such as operating the acceleration pedal while operating the shift positions of the gear lever at the right timing of when the reaction is generated, the driver only needs to operate the gear lever so as to increase the force acting on the vehicle by using the reaction in order to free the vehicle from the stuck situation. In other words, the driver easily performs the operation of the freeing the vehicle in the case where the vehicle becomes stuck while the automatic drive control is executed. Further, the vehicle drive control device according to the embodiment prevents the engine 100 from generating the driving torque before the vehicle becomes in the state where the driving torque is transmittable to the wheels, when the gear lever is shifted to the forward movement position or to the rearward movement position from the neutral position. As a result, the vehicle is prevented from suddenly accelerating, and the load applied to the transmission apparatus is also reduced/prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle drive control device comprising:
an automatic drive control means for executing an automatic drive control by controlling at least a driving torque generating device, which applies a driving torque on a vehicle, so that a vehicle speed reaches a preset target vehicle speed; and
a shift position determination means for determining a shift position of a gear lever of the vehicle, wherein in a case where the shift position determination means determines that the gear lever is set at a neutral position on the basis of a determination result of the shift position determination means while the automatic drive control is executed, the automatic drive control means controls the driving torque generating device without canceling a calculation of a target driving torque and by calculating the target drive torque to be zero so that the driving torque applied to the vehicle becomes zero while continuously executing the automatic drive control.

2. The vehicle drive control device according to claim 1 further including a clutch state determination means for determining an ON/OFF state of a clutch mechanism provided between the driving torque generating device and wheels, wherein in a case where the automatic drive control means detects that the gear lever is shifted from the neutral position to a forward movement position or to a rearward movement position based on an output of the shift position determination means and where the clutch state determination means determines that the clutch mechanism is in a ON state on the basis of an output of the clutch state determination means, the automatic drive control means controls the driving torque generating device so that the vehicle speed reaches the preset target vehicle speed.

3. The vehicle drive control device according to claim 1, wherein in a case where the shift position determination means determines that the gear lever is shifted from the neutral position to a forward movement position or to a rearward movement position and where a predetermined time has passed, the automatic drive control means controls the driving torque generating device so that the vehicle speed reaches the preset target vehicle speed.

4. The vehicle drive control device according to claim 2, wherein in a case where the shift position determination means determines that the gear lever is shifted from the neutral position to a forward movement position or to a rearward movement position and where a predetermined time has passed, the automatic drive control means controls the driving torque generating device so that the vehicle speed reaches the preset target vehicle speed.

5. A vehicle drive control device comprising:
an automatic drive control switch operable by a driver to actuate an automatic drive control;
automatic drive control means for executing the automatic drive control, following operation of the automatic drive control switch by the driver, by controlling at least a driving torque generating device, which applies a driving torque on a vehicle, so that a vehicle speed reaches a preset target vehicle speed;
shift position determination means for determining a shift position of a gear lever of the vehicle selected by the driver from amongst a plurality of shift positions that include a forward movement position in which the driving torque generating device applies driving torque on the vehicle to forward move the vehicle, a rearward movement position in which the driving torque generating device applies driving torque on the vehicle to rearward move the vehicle, and a neutral position in which the driving torque generating device does not apply driving torque on the vehicle; and
the automatic drive control means continuing to execute the automatic drive control to control the driving torque generating device in a manner applying zero driving torque to the vehicle when the automatic drive control switch is operated by the driver to actuate the automatic drive control and when the shift position determination means determines that the gear lever of the vehicle is at the neutral position.

6. The vehicle drive control device according to claim 5, further including clutch state determination means for determining a ON state and a OFF state of a clutch mechanism between the driving torque generating device and wheels of the vehicle; and when the automatic drive control means detects that the gear lever is shifted from the neutral position to either the forward movement position or the rearward movement position while the clutch state determination means determines that the clutch mechanism is in the ON state, the automatic drive control means controls the driving torque generating device so that the vehicle speed reaches the preset target vehicle speed.

7. The vehicle drive control device according to claim 5, wherein when the shift position determination means determines that the gear lever is shifted from the neutral position to either the forward movement position or the rearward movement position, and following passage of a predetermined time, the automatic drive control means controls the driving torque generating device so that the vehicle speed reaches the preset target vehicle speed.

8. The vehicle drive control device according to claim 6, wherein when the shift position determination means determines that the gear lever is shifted from the neutral position to either the forward movement position or the rearward movement position, and following passage of a predetermined time, the automatic drive control means controls the driving torque generating device so that the vehicle speed reaches the preset target vehicle speed.

* * * * *